Dec. 9, 1941.  F. LÖBLEIN  2,265,436
MANUFACTURE OF ARTICLES FROM VINYL POLYMERS
Filed May 23, 1939
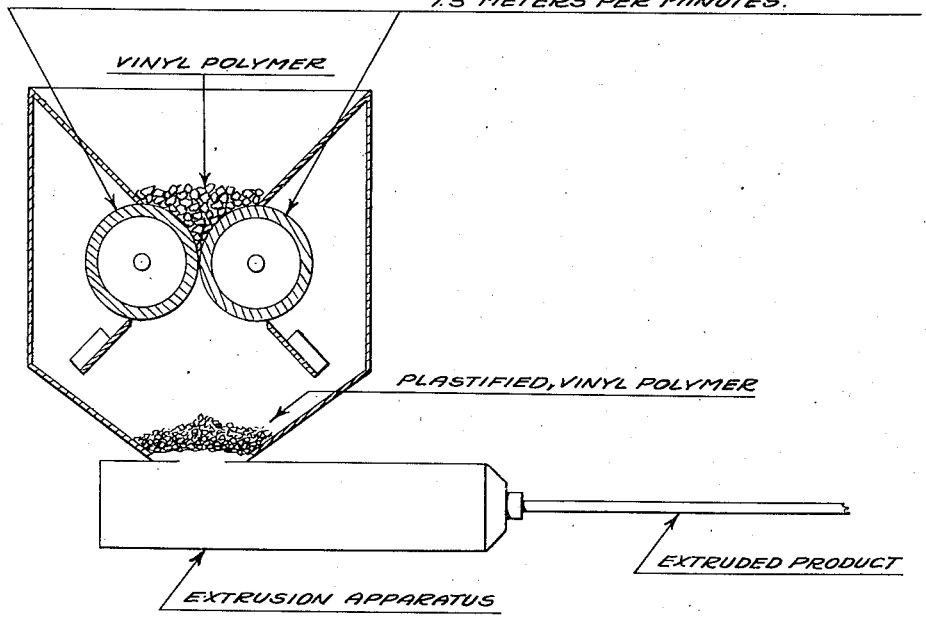
INVENTOR
FRITZ LÖBLEIN
BY
HIS ATTORNEY

UNITED STATES PATENT OFFICE 2,265,436

MANUFACTURE OF ARTICLES FROM VINYL POLYMERS

Fritz Löblein, Eilenburg, Germany, assignor to Deutsche Celluloidfabrik Aktiengesellschaft, Eilenburg, Germany, a corporation of Germany Application May 23, 1939, Serial No. 275,255
In Germany December 24, 1937

4 Claims. (Cl. 18—55)

My present invention relates to the manufacture of tubes, rods, and other extruded articles from vinyl polymers.

For the manufacture of tubes, rods or other articles by extrusion from vinyl polymerizates and mixed polymerizates of vinyl halides, vinyl acetate, the esters, amides, nitriles of the unsaturated mono- or polycarboxylic acids which have a tendency to polymerize, vinyl ethers and styrene there have generally been used the methods of operation known in the Celluloid industry. Thus, most frequently the polymer in powder form is plastified without the use of a solvent or swelling agent and the crude plastified material is finally molded in an extrusion press to the form of a tube, rod, band or other extruded plastic mass whose form will depend on the mouthpiece used in the press. The temperatures and pressures used in this stage of the process depend upon the kind of the polymer used and may be, for example, in the case of polymerized vinylchloride 160–210° C. and 50–150 atmospheres pressure on the piston. As is known, the properties of a plastified mass shaped from a vinyl polymer, whether it be a sheet or a tube, depend greatly on the molding temperature, therefore it is generally held to be advantageous to maintain within the extrusion press from the charging end to the mouthpiece a gradually rising temperature. It has been found, however, that in spite of this precaution the condition of the surface of a tube or the like fluctuates very much. From one and the same raw material successive lengths of tube may be produced in which a completely smooth and unobjectionable surface alternates with a wrinkled surface. Parallel with this very obvious alternation of the nature of the surface there is an effect on the mechanical properties of the tube in the sense that simultaneously with the appearance of the wrinkled surface the tensile strength diminishes considerably. Thus, the impact flexure strength diminishes from 85 cm. kilos per square cm. in tubes having an unobjectionable surface to 33 cm. kilos per square cm. for tubes with wrinkled surface. By using the so-called tongs test (consisting in bending a tube upward at the end by means of a pair of pincers), the difference in mechanical properties in the two kinds of tube is especially perceptible. A tube with wrinkled surface splits with a noise, whereas a smooth surface tube yields to the bending force. The same difference is to be perceived when testing the stability on freezing of the tubes. If they are charged with water which is then frozen the wrinkled tube splits in a short time, whereas the smooth tube withstands the strain safely. The elastic properties of the two tubes also differ as can be seen when they are allowed to fall from a height of some 2 meters to the ground. The tube with a smooth surface springs elastically, whereas the tube with a wrinkled surface splits. Furthermore, it is not possible to bend a wrinkled tube subsequently in a warm condition, since generally it cracks longitudinally.

It has been proposed to improve the mechanical properties of sheets, threads, bands or the like of vinyl polymers by subjecting the molded piece to a subsequent stretching. The application of this expedient in the manufacture of tubes slightly enhances the impact flexure strength of the tube. However, it is not possible thus to smooth the wrinkled surface of the tube. Since the commercial value of a tube apart from its mechanical properties depends essentially on the appearance of the tube, there is no advantage in applying this known method. Thus, one has always been faced with a certain risk in the production of tubes from vinyl polymers on a large scale. It is clear that the commercial prospect of this manufacture correspondingly suffers.

It is one object of my present invention to provide a process of producing tubes, rods or other articles by extrusion from vinyl polymers with a smooth surface free from objection and also with good mechanical properties by preliminarily plastifying the vinyl polymer on heated rollers the peripheral speed of which does not exceed 7.5 meters per minute, whereupon the sheets thus obtained are formed into tubes, rods or other articles by extrusion in known manner through the mouthpiece of an extrusion press. The peripheral speed of the rollers of a roller mill may for this purpose be the same, but they may differ from each other. In the latter case the peripheral speed of the more rapidly rotating roller should not exceed the aforesaid limit. The temperature to be maintained in this preliminary rolling depends on the raw material. For polymerized vinylchloride a temperature between 150 and 180° C. appears to be the optimum, whereas in the case of mixed polymerizates from vinyl chloride and acrylic acid esters temperatures between 125–160° C. are required. It has been the rule in the rolling of vinyl polymers to sheets that the mechanical properties of this sheet are the better the higher the rolling temperature is at constant rolling speed. The peripheral speed of the rollers as in the case of Celluloid manufacture should be about 20-28 meters per minute.

Further objects of my invention will appear from the description following hereinafter.

It has been shown that tube blanks rolled at such different temperatures always yield tubes having a wrinkled surface. Only the diminution of the rate of rotation of the rollers to a peripheral speed of at most 7.5 meters per minute ensures the production of tubes having a smooth surface free from objection and a good tensile strength from one and the same raw material. This is the more surprising since hitherto in making sheets of vinyl polymers of various kinds there has never been any observation recorded that the tensile strength of the sheets varies in dependence on the peripheral speed of the rollers when the temperature is the optimum for the vinyl polymer in use. Moreover, it has been ascertained that the rolling temperature can be adjusted to the lower limit of the temperature of working. Herein lies a further advantage of the invention, since in this manner thermal decomposition is practically wholly excluded. The preliminary rolling at a low peripheral speed has the further advantage peculiar to the manufacture of tubes that in the production of the same output of a tube press there can be used a not inconsiderably smaller pressure than when a crude plastified mass is used, which has been plastified on rapidly running rollers having a peripheral speed of 20-28 meters per minute. This entails a considerable increase in the safety of working. The invention is diagrammatically illustrated in the accompanying drawing, the legends thereon rendering it entirely self-explanatory.

The surprising influence of the peripheral speed of the rollers in the preliminary plastifying of the vinyl polymers on the surface condition and mechanical properties of the tubes persists if as a lubricating substance there is added a wax alcohol, a polymerizate of octodecyl vinyl ether or oleyl vinyl ether, if desired in admixture with each other. Notwithstanding the presence of these substances the exceeding for the above-named upper limit of the peripheral speed produces wrinkled and brittle tubes so that there is no commercial advantage. Before or during the preliminary rolling of the polymer which is to be used for the tubes there may be added, if desired, a filling agent or a dyestuff or both. The thickness of the walls of the tube depends on the intended application of the latter for which the chemical character of the vinyl polymer is a first consideration. As applications may be mentioned construction of water pipes, pipes for acid or petrol and similar products. The mode of working which has been described for the manufacture of tubes may be used also in the production of cylindrical or prismatic rods, bands or threads or other extruded articles, since it is well known that the form depends merely on the use of a correspondingly shaped mouthpiece for the extrusion press.

In the working up of vinyl polymers on heated rollers without the addition of a solvent there may be made easily sheets up to 1-2 mm. thick, but attempts to produce plates of greater thickness, for example 4-8 mm. thick by repeated rolling have led to no result even when friction rollers are used. The plates comprise enclosed air in considerable quantity which cannot be removed either by raising the temperature or by diminishing the speed of the rolling nor do these precautions lead to a smooth surface of the thick plate. Even the simultaneous use of a lubricant such as a wax alcohol contributes no improvement. The consequence is that the tensile strength of such plates is not the same at all parts since the plate is not uniform throughout.

Plates of more than 4 mm. thickness are used as such only in small quantity. Their chief application is as parent material for making objects of various kinds, for example molded articles. The irregularly distributed air bubbles in the plates and the irregular mechanical strength make it necessary in the final molding of the plate to produce an article to apply the comparatively high temperature of about 170° C. It is also necessary for avoiding irregular and wrinkled surfaces to use polished metal molds. At the same temperature technically very important polymers of vinyl chloride already suffer perceptible loss of hydrochloric acid which of course increases every time the high temperature is applied. The consequence is a rapid corrosion of the highly polished surface of the mold and also because the hydrochloric acid has no opportunity to escape at the working pressure. Thus the mold becomes more costly and the price of the whole process is increased.

The finished articles can be made from vinyl polymers in a manner which is simpler and commercially better than that hitherto used. The improved process consists in using the aforesaid manufacturing of tubes, which comprises plastifying the polymers on heated rollers the peripheral speed of which does not exceed 7.5 meters per minute, forming the sheets thus obtained into a tube by extrusion through the mouthpiece of an extrusion press, cutting in known manner the tubes thus produced and then compressing the material in wooden molds at a temperature at between 100 and 150° C. to form the desired article. The advantage of this improved process is that the vinyl polymer issues from the tube press free from enclosed air and with a completely smooth surface so that it is ready for further use and indeed under conditions which exclude repeated heating to the softening point. The complete freedom from air of the plates produced by cutting the tubes ensures uniform mechanical properties throughout the finished article. The essential advantage of the process however lies in commercial economy since the wooden molds are resistant to the attack of acid gases and provide a very smooth surface for the molding. Thus it is no longer necessary to use highly polished metal molds for producing the smooth surface; the finished articles molded at a temperature of 100 to 150° C. in wooden molds have a quite smooth surface and a uniform density throughout. The process may be still improved commercially when the molding of the finished article follows directly the production of the plate so that the heat remaining in the latter may be immediately used for the molding operation.

I claim:

1. A process of producing an article from vinyl polymers which comprises plastifying the polymers on heated rollers the peripheral speed of which does not exceed 7.5 meters per minute, and forming the sheets thus obtained into the required article by extrusion through the mouthpiece of an extrusion press.

2. A process of producing an article from vinyl polymers which comprises plastifying the polymers on heated rollers the peripheral speed of which does not exceed 7.5 meters per minute, forming the sheets thus obtained into a tube by extrusion through the mouthpiece of an extrusion press.

3. A process of producing an article from vinyl polymers which comprises plastifying the polymers on heated rollers the peripheral speed of which does not exceed 7.5 meters per minute, forming the sheets thus obtained into a tube by extrusion through the mouthpiece of an extrusion press, cutting said tube to form a plate, and molding said plate in a wooden mold at a temperature between 100 and 150° C.

4. A process of producing an article from vinyl polymers which comprises plastifying the polymers on heated rollers the peripheral speed of which does not exceed 7.5 meters per minute, forming the sheets thus obtained into a tube by extrusion through the mouthpiece of an extrusion press, cutting said tube to form a plate, and subsequently molding said plate being still hot in a wooden mold at a temperature between 100 and 150° C.

FRITZ LÖBLEIN.